US008755795B2

(12) United States Patent
Aghili

(10) Patent No.: US 8,755,795 B2
(45) Date of Patent: Jun. 17, 2014

(54) REGISTRATION SCENARIOS BETWEEN NEW AND LEGACY WIRELESS COMMUNICATION NETWORKS

(75) Inventor: Behrouz Aghili, Commack, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 567 days.

(21) Appl. No.: 12/331,780

(22) Filed: Dec. 10, 2008

(65) Prior Publication Data

US 2009/0186612 A1 Jul. 23, 2009

Related U.S. Application Data

(60) Provisional application No. 61/013,481, filed on Dec. 13, 2007.

(51) Int. Cl.
*H04W 4/00* (2009.01)
*H04W 36/00* (2009.01)
*H04W 40/00* (2009.01)

(52) U.S. Cl.
USPC .................. 455/435.1; 455/436; 455/445

(58) Field of Classification Search
USPC ............... 455/435.1–435.3, 436–443
See application file for complete search history.

(56) References Cited

U.S. PATENT DOCUMENTS 8,483,166 B2 * 7/2013 Guo .............................. 370/329
2008/0268842 A1 * 10/2008 Herrero-Veron ........... 455/435.1

OTHER PUBLICATIONS

3GPP TS 23.401 V1.1 (Nov. 2007) 3rd Generation Partnership Project; Technical Specification Group Services and System Aspects; GPRS enhancements for E-Utran access (Release 8).*
3GPP TS 23.401 V1.4.1 (Published: Nov. 2007) 3rd Generation Partnership Project; Technical Specification Group Services and System Aspects; GPRS enhancements for E-UTRAN access (Release 8).*
3GPP TSG SA WG2 TD S2-075726 (Published Nov. 16, 2007) Source: Vodafone Title: Globally Unique Temporary Identities Document for: Approval Agenda Item: 8.2.9/8.2.8 Work Item / Release: SEAS/Rel-8.*
3GPP TS 23.003 V7.5.0 (Published: Sep. 2007) 3rd Generation Partnership Project; Technical Specification Group Core Network and Terminals; Numbering, addressing and identification (Release 7).*
3GPP TS 23.401 V 1.3.0 (3GPP; Technical Specification Group Services System Aspects; GPRS enhancements for E-UTRAN access, Release 8; Published: Oct. 2007).*
Third Generation Partnership Project, "Technical Specification Group Core Network and Terminals; Numbering, Addressing and Identification (Release 7)", 3GPP TS 23.003 V7.5.0, (Sep. 2007).
Third Generation Partnership Project, "Technical Specification Group Core Network and Terminals; Numbering, Addressing and Identification (Release 7)", 3GPP TS 23.003 V7.8.0, (Sep. 2008).

(Continued)

*Primary Examiner* — Dwayne Bost
*Assistant Examiner* — Nalini Mummalaneni
(74) *Attorney, Agent, or Firm* — Volpe and Koenig, P.C.

(57) ABSTRACT

A method, wireless transmit/receive unit (WTRU), and base station for access network interworking. Temporary identity mapping rules are defined for use during access network reselection. Mapping rules for tracking area identity, routing area identity, temporary mobile subscriber identity (TMSI), packet TMSI, and S-TMSI identity are used when reselecting UTRAN, E-UTRAN, and GERAN access networks. Depending upon access network support, a WTRU may indicate a type of identity (TMSI, P-TMSI, or S-TMSI) that is included in an access network reselection request.

10 Claims, 4 Drawing Sheets

(56) References Cited

OTHER PUBLICATIONS

Third Generation Partnership Project, "Technical Specification Group Core Network and Terminals; Numbering, Addressing and Identification (Release 8)", 3GPP TS 23.003 V8.2.0, (Sep. 2008).
China Mobile et al., "Discussion on the structure of S-TMSI," 3GPP TSG SA WG2 Meeting #59, S2-073255 (Aug. 27-31, 2007).
Ericsson, "Tracking Area Update GERAN—E-UTRAN," 3GPP TSG SA WG2 Architecture—S2#58, S2-072966 (Jun. 25-29, 2007).
Huawei, "TAU Procedure Between EUTRAN and Pre-Rel-8 3GPP Access Network", 3GPP TSG SA WG2 Meeting #60, TD S2-073989, (Kobe, Japan, Oct. 8-12, 2007).
Huawei, "Discussion on the ISR Function," 3GPP TSG CT WG1 Meeting #50, C1-072857 (Nov. 5-9, 2007).
Nokia Siemens Network et al., "Interoperation RAU Flow With Pre-Rel-8 2G SGSNs", 3GPP TSG SA WG2 Meeting #59, S2-074638, (Helsinki, Finland, Aug. 27-31, 2007).
Nokia Siemens Networks et al., "ISR High Level Flows," 3GPP TSG SA WG2 Meeting #61, TD S2-075642 (Nov. 12-16, 2007).
Nokia Siemens Networks et al., "RAU procedure MME/SGW to pre-Rel-8 SGSN," 3GPP TSG SA WG2 Architecture—S2#58, S2-072750 (Jun. 25-29, 2007).
Nortel, "Flow With Pre-Rel-8 SGSNs: TAU From 2G SGSN to MME", 3GPP TSG SA WG2 Meeting #60, S2-074304, (Kobe, Japan, Oct. 8-12, 2007).
Third Generation Partnership Project, "Technical Specification Group Core Network and Terminals; Non-Access-Stratum (NAS) protocol for Evolved Packet System (EPS); Stage 3 (Release 8)," 3GPP TS 24.301 V1.1.1 (Oct. 2008).
Third Generation Partnership Project, "Technical Specification Group Core Network and Terminals; Mobile radio interface Layer 3 specification; Core network protocols; Stage 3 (Release 4)," 3GPP TS 24.008 V4.17.0 (Sep. 2007).
Third Generation Partnership Project, "Technical Specification Group Core Network and Terminals; Mobile radio interface Layer 3 specification; Core network protocols; Stage 3 (Release 5)," 3GPP TS 24.008 V5.16.0 (Jun. 2006).
Third Generation Partnership Project, "Technical Specification Group Core Network and Terminals; Mobile radio interface Layer 3 specification; Core network protocols; Stage 3 (Release 6)," 3GPP TS 24.008 V6.19.0 (Jun. 2008).
Third Generation Partnership Project, "Technical Specification Group Core Network; Mobile radio interface layer 3 specification; Core Network Protocols; Stage 3 (Release 1999)," 3GPP TS 24.008 V3.20.0 (Dec. 2005).
Third Generation Partnership Project, "Technical Specification Group Core Network and Terminals; Mobile radio interface Layer 3 specification; Core network protocols; Stage 3 (Release 6)," 3GPP TS 24.008 V6.16.0 (Jun. 2007).
Third Generation Partnership Project, "Technical Specification Group Core Network and Terminals; Mobile Radio Interface Layer 3 Specification; Core Network Protocols; State 3 (Release 7)", 3GPP TS 24.008 V7.8.0, (Jun. 2007).
Third Generation Partnership Project, "Technical Specification Group Core Network and Terminals; Mobile Radio Interface Layer 3 Specification; Core Network Protocols; State 3 (Release 7)", 3GPP TS 24.008 V7.9.0, (Sep. 2007).
Third Generation Partnership Project, "Technical Specification Group Core Network and Terminals; Mobile Radio Interface Layer 3 Specification; Core Network Protocols; State 3 (Release 7)", 3GPP TS 24.008 V7.13.0, (Sep. 2008).
Third Generation Partnership Project, "Technical Specification Group Core Network and Terminals; Mobile Radio Interface Layer 3 Specification; Core Network Protocols; State 3 (Release 8)", 3GPP TS 24.008 V8.3.0, (Sep. 2008).
Third Generation Partnership Project, "Technical Specification Group Core Network and Terminals; Numbering, Addressing and Identification (Release 7)", 3GPP TS 23.003 V7.5.0 (Sep. 2007).
Third Generation Partnership Project, "Technical Specification Group Core Network and Terminals; Numbering, Addressing and Identification (Release 7)", 3GPP TS 23.003 V7.8.0 (Sep. 2008).
Third Generation Partnership Project, "Technical Specification Group Core Network and Terminals; Numbering, Addressing and Identification (Release 8)", 3GPP TS 23.003 V8.2.0 (Sep. 2008).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.3.0 (Sep. 2008).
Third Generation Partnership Project, "Technical Specification Group Core Network; Numbering, addressing and identification (Release 1999)," 3GPP TS 23.003 V3.15.0 (Sep. 2006).
Third Generation Partnership Project, "Technical Specification Group Core Network; Numbering, addressing and identification (Release 4)," 3GPP TS 23.003 V4.9.0 (Sep. 2006).
Third Generation Partnership Project, "Technical Specification Group Core Network; Numbering, addressing and identification (Release 5), " 3GPP TS 23.003 V5.11.0 (Jun. 2006).
Third Generation Partnership Project, "Technical Specification Group Core Network and Terminals; Numbering, addressing and identification (Release 6)," 3GPP TS 23.003 V6.14.0 (Sep. 2007).
Third Generation Partnership Project, "Technical Specification Group Core Network and Terminals; Numbering, addressing and identification (Release 6)," 3GPP TS 23.003 V6.15.0 (Dec. 2007).
Third Generation Partnership Project, "Technical Specification Group Services and System Aspects; General Packet Radio Services (GPRS) enhancements for Evolved Universal Terrestrial Radio Access Network (E-UTRAN) access (Release 8)," 3GPP TS 23.401 V8.0.0 (Dec. 2007).
Third Generation Partnership Project, "Technical Specification Group Services and System Aspects; GPRS enhancements for E-UTRAN access (Release 8)," 3GPP TS 23.401 V1.4.1 (Nov. 2007).
Third Generation Partnership Project, "Technical Specification Group Terminals Specification of the Subscriber Identity Module—Mobile Equipment (SIM—ME) interface (Release 1999)," 3GPP TS 11.11 V8.14.0 (Jun. 2007).
Vodafone, "Globally Unique Temporary Identities," 3GPP TSG SA WG2 Meeting #60b—SAE drafting ad-hoc, TD S2-074896 (Nov. 7-9, 2007).

\* cited by examiner

REGISTRATION SCENARIOS BETWEEN NEW AND LEGACY WIRELESS COMMUNICATION NETWORKS

CROSS REFERENCE TO RELATED APPLICATION

This application claims the benefit of U.S. Provisional Application No. 61/013,481 filed on Dec. 13, 2007, which is incorporated herein by reference as if fully set forth.

TECHNICAL FIELD

The subject matter disclosed herein is related to wireless communications.

BACKGROUND

Referring to FIG. 1, Third Generation Partnership Project (3GPP) standards specify procedures for the inter-working between the Universal Mobile Telecommunication System (UMTS) radio access network (RAN), also referred to as UMTS Terrestrial Radio Access Network (UTRAN), enhanced UTRAN (E-UTRAN) which is also referred to as Long Term Evolution (LTE) or System Architecture Evolution (SAE) networks, and older second generation networks specified by 3GPP, such as the Global System for Mobile communications (GSM) and GSM enhanced data rates for GSM evolution (EDGE) radio access networks (GERAN). The standards consider a variety of scenarios including ones in which a wireless transmit/receive unit (WTRU) executes a cell reselection procedure that also leads to a change in access network.

One example includes a WTRU camped on a E-UTRAN cell (in the packet switched (PS) domain) and then, due to low signal quality or signal strength, for example, the WTRU reselects a GERAN cell by way of E-UTRAN-to-GERAN cell reselection. This change in access network results in a new registration process (a Routing Area (RA) update procedure) between the WTRU and the target core network (CN) and the Core Network (CN) entities. As shown in FIG. 1, these CN entities may include any of the following, a serving general packet radio service (GPRS) support node (SGSN), a mobility management entity (MME), a home subscriber server (HSS), a serving gateway, a packet data network (PDN) gateway, a policy control and charging rules function (PCRF), and other IP based services provided by a network operator. A similar procedure is also required when a WTRU is in the Circuit Switched (CS) Domain. In the CS domain, the WTRU executes a Location Update towards a Mobile services Switching Center (MSC)/Visitor Location Register (2G-MSC/VLR) (not shown).

As part of the RA update procedure (or combined RA/LA Update) the WTRU identifies itself to the target CN entities using old identities that were previously allocated to the WTRU. Which identities are included in the RA update request message depend on the originating access network of the WTRU (that is, the access network that the WTRU is handing over from). The identities may include a routing area identity (RAI), a tracking area identity (TAI), a temporary mobile subscriber identity (TMSI), a packet temporary mobile subscriber identity (P-TMSI), or an S-TMSI. These temporary identifiers have different forms based on which access network is used to generate them. The identities will now be described in greater detail.

In legacy systems (such as UTRAN and GERAN), the RA is identified by a RAI. The RAI is a concatenation of several other identifiers. The other identifiers include a mobile country code (MCC), mobile network code (MNC), location area code (LAC), and routing area code (RAC). It is noted that the combination of the MCC and MNC are also referred to as the public land mobile network (PLMN) identity. The RAI can be expressed as follows:

$$<RAI>=<MCC><MNC><LAC><RAC> \qquad \text{Equation (1)}.$$

In E-UTRAN, the RA is replaced by tracking area (TA). The TA is identified in E-UTRAN using a TAI. A TAI is a concatenation of several of the above mentioned identifiers and a tracking area code (TAC). The length of the TAC is 16 bits (two octets). The TAI is expressed as follows:

$$<TAI>=<MCC><MNC><TAC> \qquad \text{Equation (2)}.$$

Since it is undesirable for security reasons to use the permanent Subscriber Identity Module (SIM) card identity, the International Mobile Subscriber Identity number (IMSI), a TMSI, P-TMSI, or S-TMSI is assigned to a WTRU upon network attachment. A TMSI is generated for use in the CS domain, such as in a CS domain of GERAN and/or UTRAN. A P-TMSI is generated for use in the PS domain, when the WTRU attaches to the PS domain using UTRAN or GERAN as the access network. A WTRU operating in GERAN PS domain will utilize, in addition to the P-TMSI, a temporary logical link identifier (TLLI), which is derived from the P-TMSI. In LTE/SAE networks, the temporary identifier is known as the S-TMSI. The P-TMSI is 4 octets in length, that is, 32 bits. The TLLI is also 4 octets in length (32 bits). The length of the S-TMSI is 5 octets (40 bits).

This difference in length of the temporary identifiers used in the various access networks creates a problem when a WTRU informs a new target network of temporary identifiers used in a previous access network. Accordingly, mapping rules for using various identities while changing access networks are desired.

SUMMARY

A method, WTRU, and base station are disclosed for access network interworking. Mapping rules are defined for temporary identities for use during access network reselection. Mapping rules for tracking area identity, routing area identity, temporary mobile subscriber identity (TMSI), packet TMSI, and S-TMSI identity are used when reselecting UTRAN, E-UTRAN, and GERAN access networks. Depending upon access network support, a WTRU may indicate a type of identity (TMSI, P-TMSI, or S-TMSI) that is included in an access network reselection request.

DETAILED DESCRIPTION

When referred to herein, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to herein, the terminology "base station" includes but is not limited to a Node-B, a site controller, an access point (AP), or any other type of interfacing device capable of operating in a wireless environment.

This detailed description discloses embodiments in the context of LTE/SAE (E-UTRAN) inter-working with GERAN and UTRAN. These embodiments are examples and the scope of this disclosure is not limited thereto.

In the scenario where a WTRU moves from E-UTRAN to GERAN, a RA update procedure is performed. This RA update procedure begins with the WTRU transmitting a RA Update Request message. This message includes an identity currently associated with the WTRU (in this case, an E-UTRAN identity as the WTRU is moving from E-UTRAN) and an Old Routing Area Identity (RAI).

As the WTRU moves to the GERAN access network, the standardized procedures for network entry require a Temporary Logical Link Identifier (TLLI) to be transmitted by the WTRU directed to a GERAN SGSN. Accordingly, in this scenario the WTRU does not transmit any identity in the non-access stratum (NAS) RA update request message. The TLLI is derived from an existing P-TMSI if one is available, and if no P-TMSI is available a TLLI is randomly selected. The WTRU must then transmit its previous TAI in the Old RAI IE of the RA update request message.

Figure 1:
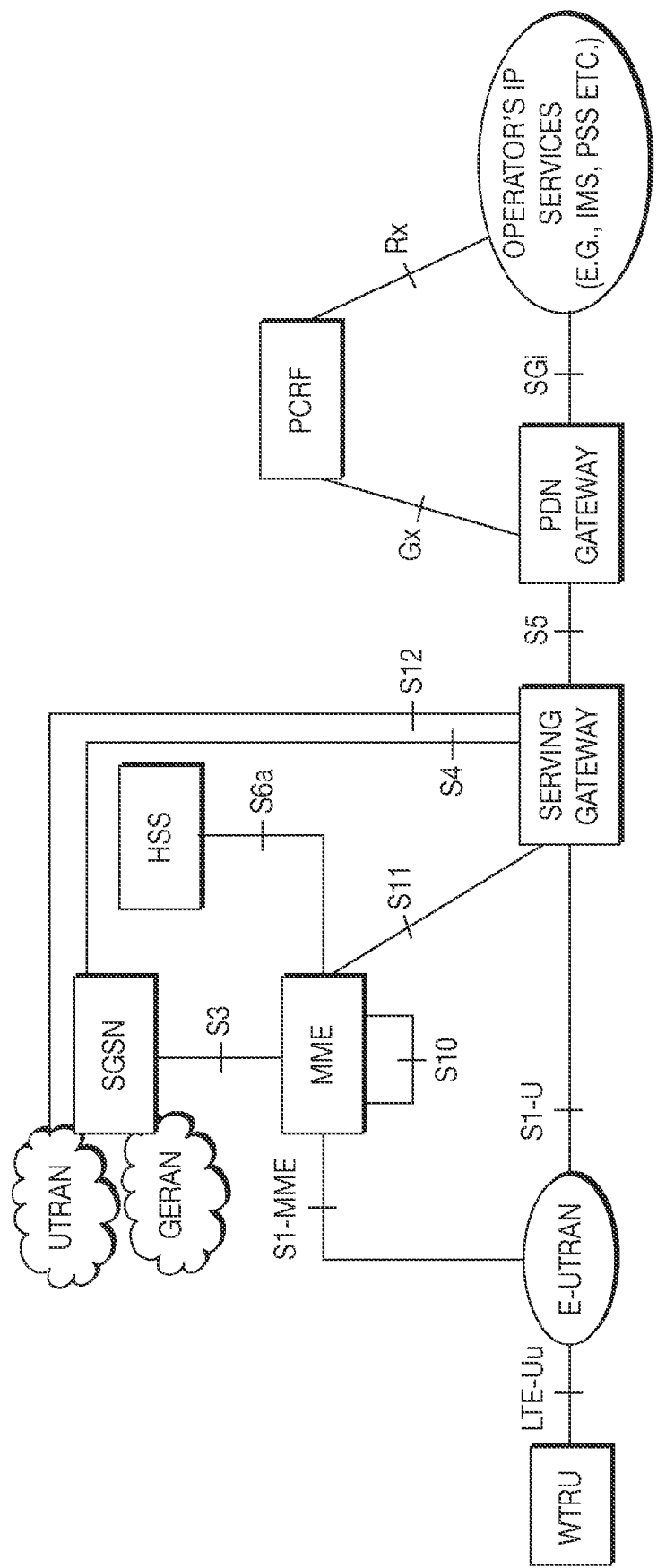
FIG. 1 shows a non-roaming architecture for 3GPP access networks.
Figure 2:
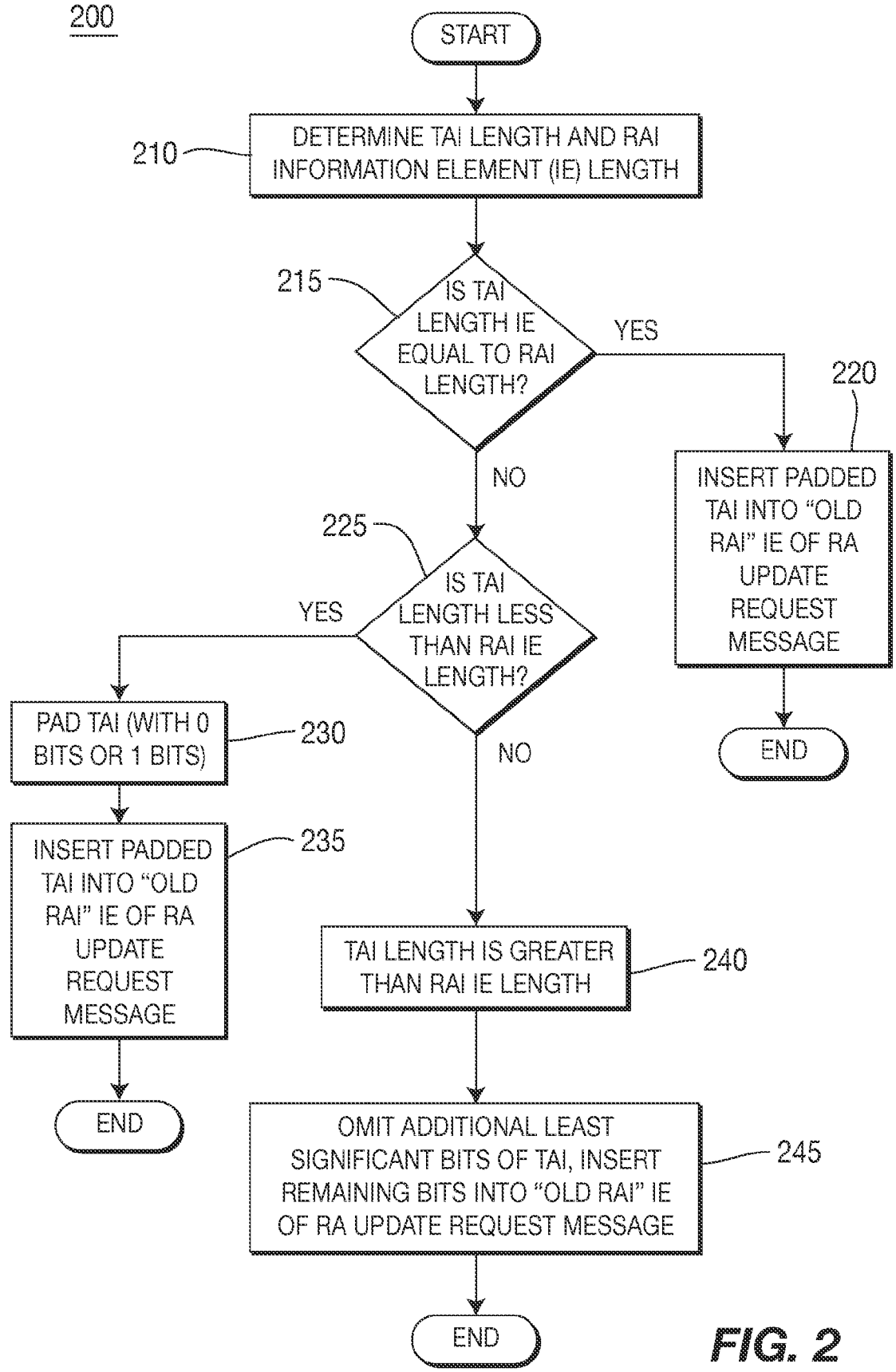
FIG. 2 is a flow diagram of a method for mapping TAI to RAI for inclusion in a routing area update request message.

Referring to FIG. 2, a method 200 for mapping a known TAI into a RAI information element (IE) for inclusion in a RA update request message begins by determining the TAI length (in bits) and the RAI IE length, (step 210). It is then determined whether the TAI length is equal to the RAI IE length, (step 215). If the TAI length is equal to the RAI IE length, the entire TAI is inserted into the RAI IE unchanged, (step 220). If the TAI length is not equal to the RAI IE length, it is then determined whether the TAI length is less than the RAI IE length, (step 225). In the case that the TAI length is less than the RAI IE length, the TAI is padded with either zero (0) or one (1) bits so that the length of the TAI is equal to the length of the TAI IE length, (step 230). The padded TAI is then inserted into the RAI IE of the RA update request message, (step 235). In the case that the TAI length is not less than the RAI IE length (step 225), it is then determined that the TAI length is greater than the RAI IE length, (step 240). In this case, the least significant bits of the TAI are omitted upon insertion of the TAI into the RAI IE of the RA update request message, (step 245).

It is noted that the method 200 described above with reference to FIG. 2 is one of many ways to implement the basic rule for mapping TAI to RAI. This basic mapping rule is simply (1) pad a short TAI, (2) omit additional bits of a long TAI, and (3) when the TAI is the same length as the RAI, map the two bit-for-bit.

As mentioned above, a Foreign TLLI also needs to be generated when reselecting a GERAN cell. In order to generate the TLLI, the last octet of the S-TMSI, which contains the 8 least significant bits, may be omitted and then a "Foreign TLLI" may be created based on well known numbering, addressing, and identification rules.

In a situation where a WTRU is camped on an E-UTRAN cell and, for whatever reason, reselects a UTRAN cell, the WTRU will identify itself using a P-TMSI. Since the WTRU is not handing over to a GERAN cell, it is not necessary to derive a TLLI and instead a direct mapping between the S-TMSI and P-TMSI may be used according to the rules defined above in the first embodiment.

Figure 3:
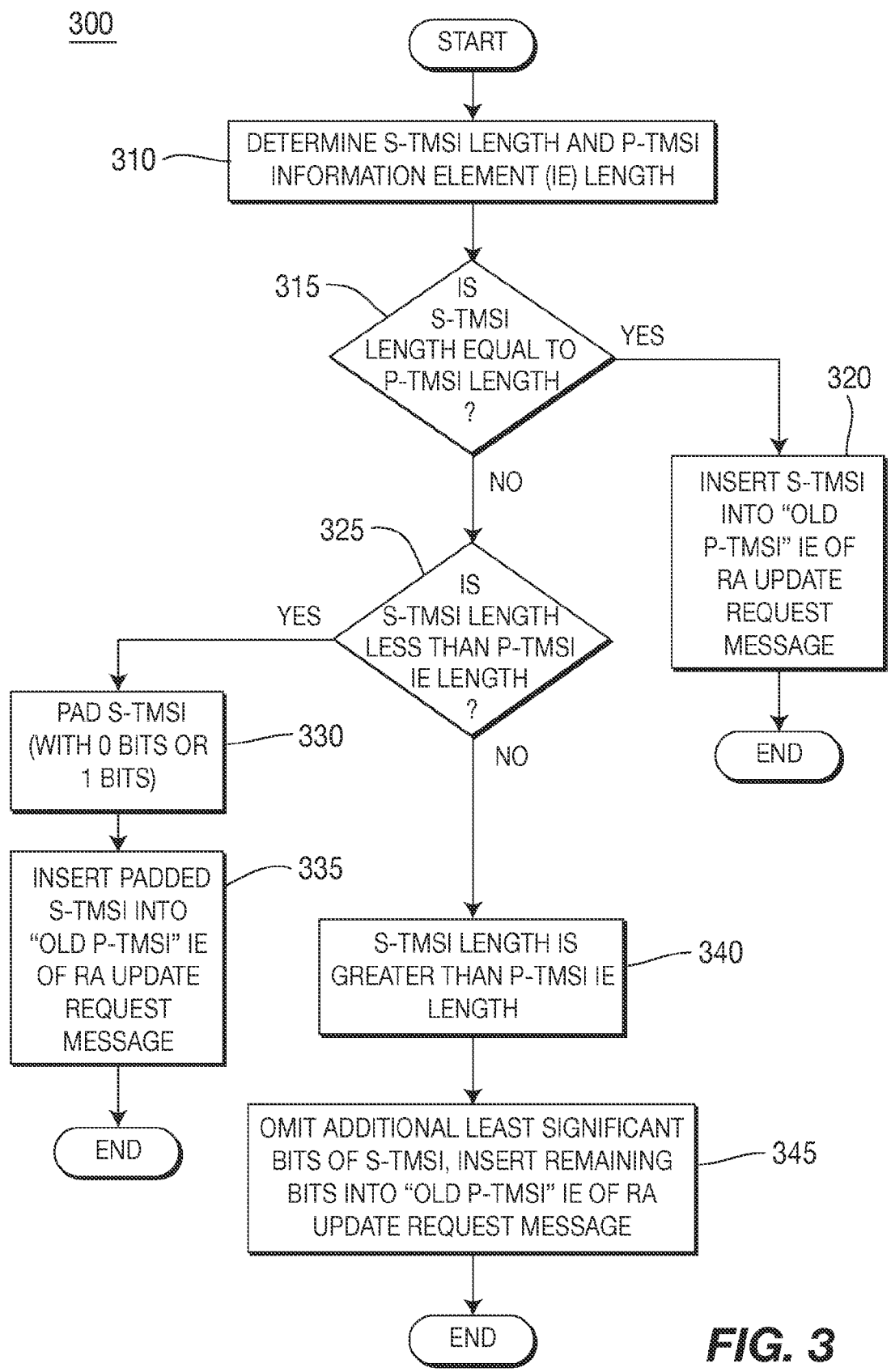
FIG. 3 is a flow diagram of a method for mapping S-TMSI to P-TMSI for inclusion in a routing area update request message.

Referring to FIG. 3, a method 300 for mapping a known S-TMSI into an old P-TMSI information element (IE) for inclusion in an RA update request message begins by determining the S-TMSI length (in bits) and the P-TMSI IE length, (step 310). It is then determined whether the S-TMSI length is equal to the P-TMSI IE length, (step 315). If the S-TMSI length is equal to the P-TMSI IE length, the entire S-TMSI is inserted into the P-TMSI IE unchanged, (step 320). If the S-TMSI length is not equal to the -TMSI IE length, it is then determined whether the S-TMSI length is less than the P-TMSI IE length, (step 325). In the case that the S-TMSI length is less than the P-TMSI IE length, the S-TMSI is padded with either zero (0) or one (1) bits so that the length of the S-TMSI is equal to the length of the P-TMSI IE length, (step 330). The padded S-TMSI is then inserted into the P-TMSI IE of the RA update request message, (step 335). In the case that the S-TMSI length is not less than the P-TMSI IE length (step 325), it is then determined that the S-TMSI length is greater than the P-TMSI IE length, (step 340). In this case, the least significant bits of the S-TMSI are omitted upon insertion of the S-TMSI into the P-TMSI IE of the RA update request message, (step 345).

It is noted that the method 300 described above with reference to FIG. 3 is one of many ways to implement the basic rule for mapping S-TMSI to P-TMSI. This basic mapping rule is simply (1) pad a short S-TMSI, (2) omit additional bits of a long S-TMSI, and (3) when the S-TMSI is the same length as the P-TMSI, map the two bit-for-bit.

Alternatively, when the SGSN of the UTRAN to which the WTRU is handing over is compatible with the Release 8 version of the 3GPP UMTS standard, an indicator in the System Information Blocks for the UTRAN cell is broadcast. The WTRU may receive the System Information Blocks and recognize that the SGSN is capable of handling encoding of non-access stratum (NAS) messages as specified in the Release 8 standard. The WTRU may then explicitly indicate the type of identity (that is, P-TMSI, or S-TMSI) it is including in a Mobile Identity IE that is included in the RA Update Request message.

Figure 4:
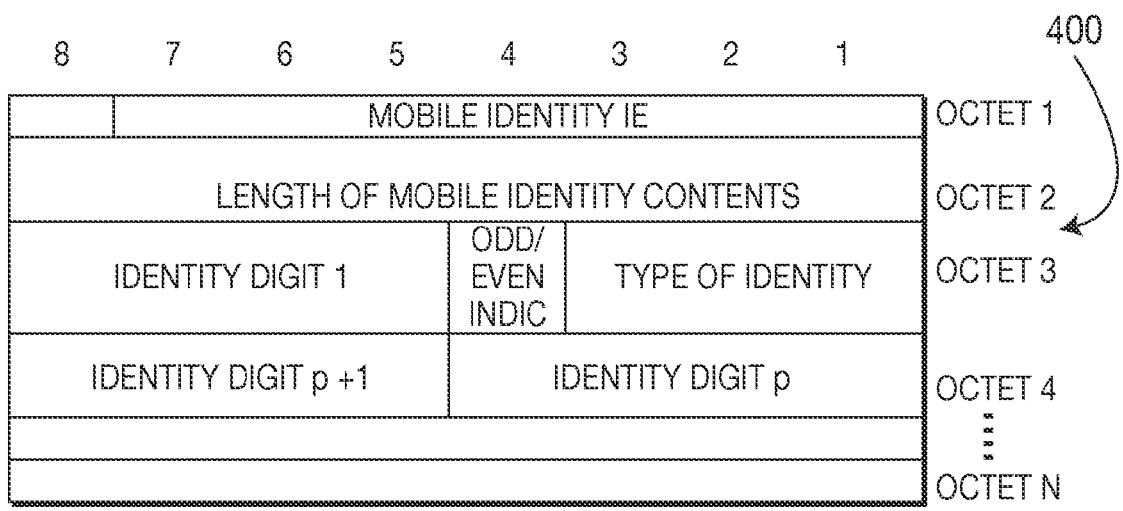
FIG. 4 is a representation of a Mobile Identity information element that allows for indication of an S-TMSI.

Referring to FIG. 4, the WTRU indicates the type of Mobile Identity being transmitted in the RA Update Request message by setting the appropriate value in the Type of identity field in octet 3 of the Mobile Identity IE 400. The Type of identity field is three bits long thereby providing eight possible code points. One of the eight possible code points is set to indicate S-TMSI as the type of identity included in the Mobile Identity IE 400. Since the length of the S-TMSI will definitely be shorter than the IMSI, there cannot exist any ambiguity. The length of the Mobile Identity IE 400 is also variable. The variable length of the Mobile Identity IE 400 is indicated in FIG. 4 where N octets are available. The length of the Mobile Identity IE 400 is set by the WTRU based on the S-TMSI length. For example, if the length of S-TMSI is five octets, the total length of the Mobile Identity IE 400 shall be eight octets.

Figure 5:
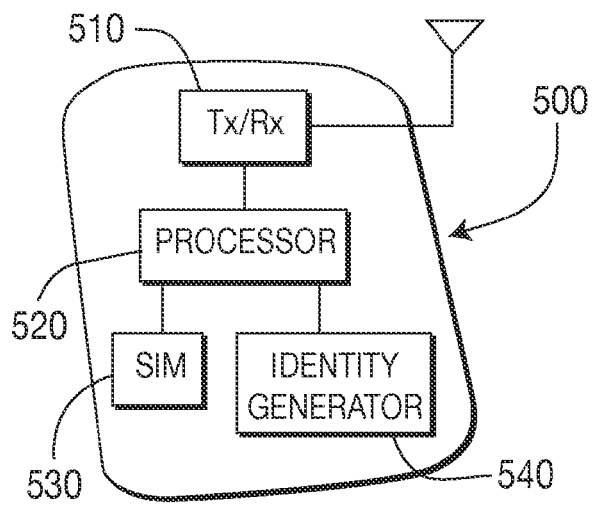
FIG. 5 is a block diagram of a WTRU configured to perform the methods disclosed herein.

Referring to FIG. 5, a WTRU 500 that is configured to perform cell reselection and handover in accordance with the methods described above includes a transceiver (Tx/Rx) 510, a processor 520, a SIM card 530, and an Identity generator 540. The transceiver 510 allows the WTRU 500 to communicate with various access networks via an air interface. The processor 520 performs all processing functions required by the WTRU 500 including generating and encoding messages for access network reselection, including RA update request messages and Mobile Identity IEs as described above. The SIM card 530 includes an IMSI that is unique to the SIM card. The identity generator 540, in combination with or as a sub-unit of the processor 520, performs the mapping of TAI to RAI, RAI to TAI, S-TMSI to P-TMSI, P-TMSI to S-TMSI, and generation of the TLLI as described herein. Although not shown, the WTRU 500 may include additional structural components that are typically associated with a WTRU. These additional components may include, and are not limited to, an input device (for example a keypad, keyboard, and/or touch screen), a display, a speaker, a microphone, a motion sensor, an accelerometer, and the like. Several other additional components are discussed below.

Figure 6:
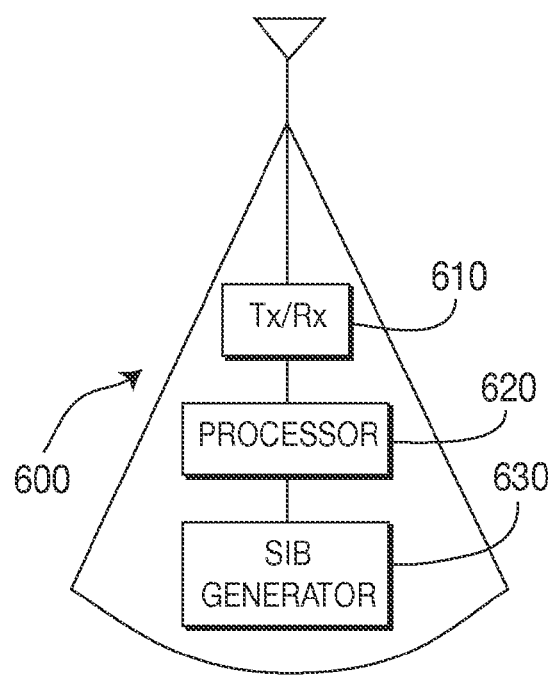
FIG. 6 is a block diagram of a base station configured to perform the methods disclosed herein.

Referring to FIG. 6, a base station 600 that is configured to assist a WTRU, such as WTRU 500 described above with reference to FIG. 5, includes a transceiver (Tx/Rx) 610, a processor 620, and a SIB generator 630. The transceiver 640 allows the base station 600 to communicate with WTRUs in the base station's 600 coverage area via an air interface. The processor 620 performs all processing functions required by the base station 600 including processing access stratum (AS) and non-access stratum (NAS) messages related to cell reselection and handover as discussed herein. SIB generator 630 generates SIBs as described above including information regarding standard release compatibility. The processor 620 processes Mobile Identity IEs received in a RA update request message from a WTRU via the transceiver 610. The processor 620 then identifies the type of identity received based on the type of identity indicated in the received Mobile Identity IE, as described herein.

Although the features and elements of the present disclosure are described in the embodiments in particular combinations, each feature or element can be used alone without the other features and elements of the embodiments or in various combinations with or without other features and elements of the present disclosure. The methods or flow charts provided in the present disclosure may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for use in a wireless transmit/receive unit (WTRU), the method comprising:
   generating a routing area indicator (RAI) information element (IE) based on tracking area indicator (TAI) data, wherein the RAI IE is longer than the TAI data;
   generating a Packet Temporary Mobile Subscriber Identity (P-TMSI) IE based on a S-temporary mobile subscriber identity (S-TMSI), wherein at least one bit of the S-TMSI is not included in the P-TMSI;
   generating a routing area update request message, wherein the routing area update request message includes the RAI IE and the P-TMSI; and
   transmitting the routing area update request message.

2. The method of claim 1, wherein the TAI data is associated with an enhanced universal mobile telecommunication system terrestrial radio access network (E-UTRAN).

3. The method of claim 1, wherein the routing area update request message is transmitted to a universal mobile telecommunication system terrestrial radio access network (UTRAN).

4. The method of claim 1, wherein the routing area update request message is transmitted to a global system for mobile communications (GSM) enhanced data rates for GSM evolution (EDGE) radio access network (GERAN).

5. A wireless transmit/receive unit (WTRU) comprising:
   a processor configured to:
      generate a routing area indicator (RAI) information element (IE) based on tracking area indicator (TAI) data, wherein the RAI IE is longer than the TAI data;
      generate a Packet-Temporary Mobile Subscriber Identity (P-TMSI) IE based on an S-temporary mobile subscriber identity (S-TMSI), wherein at least one bit of the S-TMSI is not included in the P-TMSI; and
      generate a routing area update request message, wherein the routing area update request message includes the RAI IE and the P-TMSI; and
   a transmitter configured to transmit the routing area update request message.

6. The WTRU of claim 5, wherein the TAI data is associated with an enhanced universal mobile telecommunication system terrestrial radio access network (E-UTRAN).

7. The WTRU of claim 5 wherein the transmitter is further configured to transmit the routing area update request message to a universal mobile telecommunication system terrestrial radio access network (UTRAN).

8. The WTRU of claim 5, wherein the transmitter is further configured to transmit the routing area update request message to a global system for mobile communications (GSM) enhanced data rates for GSM evolution (EDGE) radio access network (GERAN).

9. The method of claim 1, wherein the at least one bit of the S-TMSI not included in the P-TMSI is the at least one least significant bit of the S-TMSI.

10. The WTRU of claim 5, wherein the at least one bit of the S-TMSI not included in the P-TMSI is the at least one least significant bit of the S-TMSI.

* * * * *